United States Patent
Sugihara et al.

(10) Patent No.: US 8,718,487 B2
(45) Date of Patent: May 6, 2014

(54) OPTICAL TRANSMITTER

(75) Inventors: Takashi Sugihara, Tokyo (JP); Soichiro Kametani, Tokyo (JP); Takashi Mizuochi, Tokyo (JP); Yoshiaki Konishi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 161 days.

(21) Appl. No.: 13/140,955

(22) PCT Filed: Jan. 13, 2010

(86) PCT No.: PCT/JP2010/050264
§ 371 (c)(1),
(2), (4) Date: Jun. 20, 2011

(87) PCT Pub. No.: WO2010/082578
PCT Pub. Date: Jul. 22, 2010

(65) Prior Publication Data
US 2011/0255876 A1 Oct. 20, 2011

(30) Foreign Application Priority Data

Jan. 16, 2009 (JP) ................................ 2009-007633

(51) Int. Cl.
*H04B 10/00* (2013.01)
(52) U.S. Cl.
USPC ............ 398/193; 398/192; 398/195; 398/200
(58) Field of Classification Search
USPC .................................................. 398/182–201
See application file for complete search history.

(56) References Cited

U.S. PATENT DOCUMENTS

| 6,407,845 | B2 | 6/2002 | Nakamoto |
| 7,023,601 | B2 * | 4/2006 | McGhan et al. ............... 359/246 |

(Continued)

FOREIGN PATENT DOCUMENTS

| JP | 2002 023124 | 1/2002 |
| JP | 2004 516743 | 6/2004 |

(Continued)

OTHER PUBLICATIONS

Office Action issued Nov. 6, 2012 in Japanese Patent Application No. 2009-007633 (with English-language translation).

(Continued)

*Primary Examiner* — Agustin Bello
(74) *Attorney, Agent, or Firm* — Oblon, Spivak, McClelland, Maier & Neustadt, L.L.P.

(57) ABSTRACT

An optical transmitter for converting an input data series into an optical multi-level signal and for outputting the same, includes an LUT in which data for executing optical multi-level modulation is stored and from which first modulation data and second modulation data are output based on the input data series. A DAC converts the first modulation data by D/A conversion to generate a first multi-level signal. A DAC converts the second modulation data by D/A conversion to generate a second multi-level signal. A dual-electrode MZ modulator includes a first phase modulator for modulating light from a light source in accordance with the first multi-level signal and a second phase modulator for modulating light from the light source in accordance with the second multi-level signal, and combines an optical signal from the first phase modulator and an optical signal from the second phase modulator to output the optical multi-level signal.

7 Claims, 9 Drawing Sheets

(56) References Cited

U.S. PATENT DOCUMENTS

| | | | |
|---|---|---|---|
| 7,058,313 B2 | 6/2006 | Shimizu et al. | |
| 7,092,643 B2 | 8/2006 | Kajiya et al. | |
| 7,376,358 B2* | 5/2008 | Roberts et al. | 398/193 |
| 7,382,984 B2* | 6/2008 | McNicol et al. | 398/147 |
| 7,546,041 B2 | 6/2009 | Griffin | |
| 7,609,935 B2* | 10/2009 | Burchfiel | 385/147 |
| 7,660,537 B2* | 2/2010 | Fishman et al. | 398/193 |
| 7,680,420 B1* | 3/2010 | Walker et al. | 398/183 |
| 7,787,778 B2* | 8/2010 | Harley et al. | 398/195 |
| 7,805,082 B1* | 9/2010 | Whiteaway | 398/147 |
| 7,809,281 B2* | 10/2010 | Ishida et al. | 398/188 |
| 7,907,850 B2* | 3/2011 | Tanaka et al. | 398/141 |
| 8,059,970 B2* | 11/2011 | Harley et al. | 398/198 |
| 2004/0197103 A1* | 10/2004 | Roberts et al. | 398/159 |
| 2005/0007642 A1* | 1/2005 | McGhan et al. | 359/237 |
| 2008/0019703 A1* | 1/2008 | Burchfiel | 398/183 |
| 2008/0232820 A1* | 9/2008 | Burchfiel | 398/183 |
| 2009/0185810 A1* | 7/2009 | Kaplan et al. | 398/184 |
| 2009/0196602 A1* | 8/2009 | Saunders et al. | 398/26 |
| 2009/0238580 A1 | 9/2009 | Kikuchi | |
| 2011/0013907 A1 | 1/2011 | Sugihara et al. | |
| 2011/0255876 A1* | 10/2011 | Sugihara et al. | 398/188 |

FOREIGN PATENT DOCUMENTS

| | | |
|---|---|---|
| JP | 2006 522508 | 9/2006 |
| JP | 2007 259281 | 10/2007 |
| JP | 2007 286551 | 11/2007 |
| JP | 2007 288591 | 11/2007 |
| JP | 2009 231881 | 10/2009 |
| JP | 2009 267934 | 11/2009 |
| JP | 2009 303136 | 12/2009 |

OTHER PUBLICATIONS

Akito Chiba, et al., "Discrimination of Distorted Multilevel Optical Signal for Decoding of a High-Speed Optical QAM signal", IEICE Technical Report, Optical Communication System, vol. 108, No. 133, Jul. 10, 2008, pp. 27-32 (plus cover page).

Philip Watts, et al., "An FPGA-Based Optical Transmitter Design Using Real-Time DSP for Advanced Signal Formats and Electronic Predistortion", Journal of Lightwave Technology, vol. 25, No. 10, Oct. 2007, pp. 3089-3099 (plus cover page).

Ho, K.-P., et al., "Generation of Arbitrary Quadrature Signals Using One Dual-Drive Modulator," Journal of Lightwave Technology, vol. 23, No. 2, pp. 764-770, (Feb. 2005).

Sakamoto, T., et al., "50-Gb/s 16 QAM by a quad-parallel Mach-Zehnder modulator," ECOC2007, PD2.8, total 2 pages, (2007).

Krause, D.J., et al., "Demonstration of 20-Gb/s DQPSK With a Single Dual-Drive Mach-Zehnder Modulator," IEEE Photonics Technology Letters, vol. 20, No. 16, pp. 1363-1365, (Aug. 15, 2008).

McGhan, D., et al., "Electronic Dispersion Compensation," OFC/NFOEC 2006 Tutorial, OWK1, total 15 pages, (2006).

International Search Report issued Apr. 13, 2010 in PCT/JP10/050264 filed Jan. 13, 2010.

U.S. Appl. No. 13/498,626, filed Mar. 28, 2012, Mizuochi, et al.

\* cited by examiner

RELATION BETWEEN (4-BIT) INPUT DATA AND
MODULATOR DRIVE VOLTAGE IN 16-QAM

| 4-BIT DATA STRING = LUT ADDRESS (b0 b1 b2 b3) | DRIVE ELECTRICAL SIGNAL | | LUT STORED DATA (6bit) | |
|---|---|---|---|---|
| | V1(t) | V2(t) | V1(t) | V2(t) |
| (0000) | -0.75 Vπ | -0.75 Vπ | 000000 | 001101 |
| (0001) | -0.67 Vπ | -1.13 Vπ | 000011 | 000000 |
| (0010) | 0.75 Vπ | 0.75 Vπ | 110010 | 111111 |
| (0011) | 1.13 Vπ | 0.67 Vπ | 111111 | 111100 |
| (0100) | -0.37 Vπ | -0.83 Vπ | 001101 | 001010 |
| (0101) | -0.36 Vπ | -1.14 Vπ | 001101 | 000000 |
| (0110) | 0.83 Vπ | 0.37 Vπ | 110101 | 110010 |
| (0111) | 1.14 Vπ | 0.36 Vπ | 111111 | 110010 |
| (1000) | -0.25 Vπ | -0.25 Vπ | 010001 | 011110 |
| (1001) | 0.13 Vπ | -0.33 Vπ | 011101 | 011011 |
| (1010) | 0.25 Vπ | 0.25 Vπ | 100001 | 101110 |
| (1011) | 0.33 Vπ | -0.13 Vπ | 100100 | 100010 |
| (1100) | -0.17 Vπ | -0.63 Vπ | 010011 | 010001 |
| (1101) | 0.14 Vπ | -0.64 Vπ | 011110 | 010001 |
| (1110) | 0.63 Vπ | 0.17 Vπ | 101101 | 101100 |
| (1111) | 0.64 Vπ | -0.14 Vπ | 101110 | 100001 |

Fig. 4

RELATION BETWEEN (4-BIT) INPUT DATA AND
MODULATOR DRIVE VOLTAGE IN 16-QAM

| 4-BIT DATA STRING = LUT ADDRESS (b0 b1 b2 b3) | DRIVE ELECTRICAL SIGNAL | | LUT STORED DATA (6bit) | |
|---|---|---|---|---|
| | V1(t) | V2(t) | V1(t) | V2(t) |
| (0000) | −0.75 Vπ | −0.75 Vπ | 000000 | 000101 |
| (0001) | 0.87 Vπ | −0.67 Vπ | 111111 | 001000 |
| (0010) | 0.75 Vπ | 0.75 Vπ | 111010 | 111111 |
| (0011) | 0.67 Vπ | −0.87 Vπ | 110111 | 000000 |
| (0100) | −0.37 Vπ | −0.83 Vπ | 001111 | 000001 |
| (0101) | 0.86 Vπ | −0.36 Vπ | 111111 | 010100 |
| (0110) | 0.83 Vπ | 0.37 Vπ | 111110 | 110000 |
| (0111) | 0.36 Vπ | −0.86 Vπ | 101011 | 000000 |
| (1000) | −0.25 Vπ | −0.25 Vπ | 010011 | 011000 |
| (1001) | 0.13 Vπ | −0.33 Vπ | 100010 | 010101 |
| (1010) | 0.25 Vπ | 0.25 Vπ | 100111 | 101100 |
| (1011) | 0.33 Vπ | −0.13 Vπ | 101010 | 011101 |
| (1100) | −0.17 Vπ | −0.63 Vπ | 010111 | 001001 |
| (1101) | 0.14 Vπ | −0.64 Vπ | 100011 | 001001 |
| (1110) | 0.63 Vπ | 0.17 Vπ | 110110 | 101000 |
| (1111) | 0.64 Vπ | −0.14 Vπ | 110110 | 011100 |

Fig. 5

EXAMPLE OF INPUT DATA AND LUT STORED DATA IN 16-QAM

| 4-BIT DATA STRING = LUT ADDRESS (b0 b1 b2 b3) | LUT STORED DATA (7bit) | | | LUT STORED DATA (7bit) | |
|---|---|---|---|---|---|
| | V1(t) | V2(t) | (×1.1) ⇒ | V1(t) | V2(t) |
| (0000) | 0000000 | 0001101 | | 0000000 | 0001110 |
| (0001) | 0000011 | 0000000 | | 0000011 | 0000000 |
| (0010) | 0110010 | 0111111 | | 0111000 | 1000110 |
| (0011) | 0111111 | 0111100 | | 1000110 | 1000011 |
| (0100) | 0001101 | 0001010 | | 0001110 | 0001011 |
| (0101) | 0001101 | 0000000 | | 0001111 | 0000000 |
| (0110) | 0110101 | 0110010 | | 0111011 | 0111000 |
| (0111) | 0111111 | 0110010 | | 1000110 | 0110111 |
| (1000) | 0010001 | 0011110 | | 0010011 | 0100001 |
| (1001) | 0011101 | 0011011 | | 0100001 | 0011110 |
| (1010) | 0100001 | 0101011 | | 0100101 | 0110011 |
| (1011) | 0100100 | 0100010 | | 0101000 | 0100101 |
| (1100) | 0010011 | 0010001 | | 0010110 | 0010011 |
| (1101) | 0011110 | 0010001 | | 0100001 | 0010010 |
| (1110) | 0101110 | 0101100 | | 0110011 | 0110000 |
| (1111) | 0101110 | 0100001 | | 0110100 | 0100101 |

Fig. 9

OPTICAL TRANSMITTER

TECHNICAL FIELD

The present invention relates to an optical transmitter for converting an electrical signal into an optical signal and transmitting the optical signal.

BACKGROUND ART

In order to realize a large capacity of a WDM optical communication system, it is useful to increase a transmission rate per wavelength. When a symbol rate of symbols transmitted to an optical transmission line is increased without changing a modulation method, there is a problem in that wavelength dispersion tolerance of the optical transmission line reduces because an allowable residual dispersion amount is inversely proportional to the square of the symbol rate. It is necessary to execute electrical signal processing at a high rate, and hence there is a problem in that the cost of an analog electrical part increases.

Therefore, in recent years, researches for improving signal multiplicity per symbol without increasing the symbol rate so as to realize the large capacity of the system have been actively conducted.

Known examples of a method of improving the signal multiplicity include multi-level modulation methods such as a QPSK method of assigning two values (multiplicity is two) to each symbol to increase a transmission capacity two times, a 16-QAM method of assigning four values (multiplicity is four) to each symbol to increase the transmission capacity four times, and a 16-APSK method.

In general, when any of the multi-level modulation methods is executed, an I/Q modulator is used as an optical modulator. The I/Q modulator is modulator capable of independently generating orthogonal optical electric field components (I channel and Q channel) and has a special structure in which Mach-Zehnder (MZ) modulators are connected in parallel.

For example, when the QPSK modulation method is to be executed, a dual parallel MZ modulator (DPMZM) is used in which two MZ modulators are connected in parallel (see, for example, Patent Literature 1).

When the modulation by 16-QAM is executed, the DPMZM or a quad parallel MZ modulator (QPMZM) in which two DPMZMs are connected in parallel is used (see, for example, Non-Patent Literature 1).

Even when any of the modulators as described in Patent Literature 1 and Non-Patent Literature 1 is used, the number of MZ modulators increases, and hence there is a problem in that a cost and the number of bias control points increase.

Therefore, it is expected to use a dual-electrode MZ modulator (dual drive MZM (DDMZM)) in which two phase modulators are connected in parallel, so as to realize the multi-level modulation (see, for example, Patent Literature 2 and Non-patent Literature 2).

The dual-electrode MZ modulator is an optical part widely applied as a push-pull optical modulator to a normal optical transmitter-receiver, and hence a reduction in cost may be realized. In addition, a light insertion loss may be reduced because of the structure in which light passes through the MZ modulator only once.

CITATION LIST

Patent Literature

[PTL 1] JP 2004-516743 A
[PTL 2] U.S. Pat. No. 7,023,601

Non-Patent Literature

[NPL 1] T. Sakamoto, et al., "50-Gb/s 16 QAM by a quad-parallel Mach-Zehnder modulator", ECOC2007, PD2.8, 2007 [NPL 2] K-P. Ho, et al., "Generation of Arbitrary Quadrature Signals Using One Dual-Drive Modulator", IEEE J. Lightwave Technol., Vol. 23, No. 2, February 2005, pp. 764-770

SUMMARY OF INVENTION

Technical Problem

However, prior art has the following problem.
Conventional optical transmitters need to execute multi-level modulation processing for an input data series which is input at a high rate, and consequently have a problem in that the processing load is heavy.

The present invention has been made to solve the problem described above, and an object of the present invention is to provide an optical transmitter capable of lessening the processing load of multi-level modulation processing.

Solution to Problem

According to the present invention, an optical transmitter for converting an input data series which is an input electrical signal into an optical multi-level signal and for outputting the optical multi-level signal, includes: a look-up table in which data for executing optical multi-level modulation is stored and from which first modulation data and second modulation data are output based on the input data series; a first D/A converter which converts the first modulation data by D/A conversion to generate a first multi-level signal; a second D/A converter which converts the second modulation data by D/A conversion to generate a second multi-level signal; and a dual-electrode MZ modulator which includes a first phase modulator for modulating light from a light source in accordance with the first multi-level signal and a second phase modulator for modulating light from the light source in accordance with the second multi-level signal, and which combines an optical signal from the first phase modulator and an optical signal from the second phase modulator to output the optical multi-level signal.

Advantageous Effects of Invention

The optical transmitter according to the present invention includes a look-up table in which data for executing optical multi-level modulation is stored and from which first modulation data and second modulation data are output based on an input data series. This way, the first modulation data and the second modulation data are each output on a one-on-one basis with respect to the input data series.

The processing load of multi-level modulation processing can thus be lessened.

BRIEF DESCRIPTION OF DRAWINGS

FIG. 4 An explanatory diagram illustrating an example of a first drive electrical signal and a second drive electrical signal that are necessary to realize the signal constellation point arrangement of FIG. 2, and stored data of an LUT that is stored when the DACs have a resolution of 6 bits.

FIG. 5 An explanatory diagram illustrating another example of the first drive electrical signal and the second drive electrical signal that are necessary to realize the signal constellation point arrangement of FIG. 2, and stored data of the LUT that is stored when the DACs have a resolution of 6 bits.

FIG. 9 An explanatory diagram illustrating an example of how stored data of the LUT is set when the drive amplitude of the drive electrical signals is reduced from the optimum value in the first embodiment of the present invention.

DESCRIPTION OF EMBODIMENT

Hereinafter, an embodiment of the present invention is described with reference to the attached drawings. In the respective drawings, the same or corresponding components are expressed for description by the same reference symbols.

The following embodiment has a configuration that includes an S/P conversion unit 1 and a P/S conversion unit 4. However, the S/P conversion unit 1 and the P/S conversion unit 4 are unnecessary in the case where processing of an LUT 2 is executed at the same rate as that of an input data series.

First Embodiment

Figure 1:
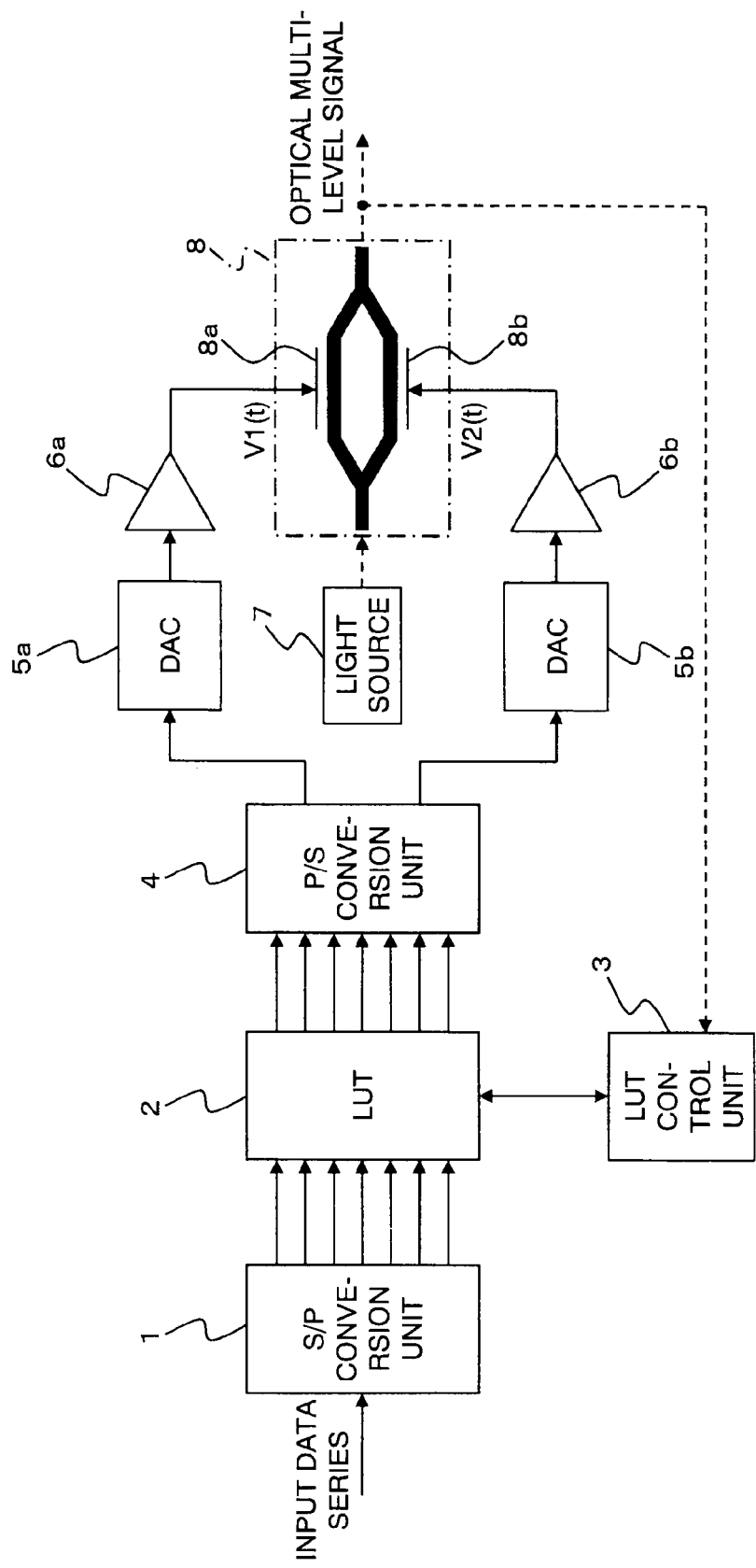
FIG. 1 A block configuration diagram illustrating an optical transmitter according to a first embodiment of the present invention.

FIG. 1 is a block configuration diagram illustrating an optical transmitter according to a first embodiment of the present invention.

In FIG. 1, the optical transmitter includes the S/P (serial/parallel) conversion unit 1, the look-up table 2, a look-up table control unit 3, the P/S (parallel/serial) conversion unit 4, two D/A converters, 5a and 5b (a first D/A converter and a second D/A converter), two electrical amplifiers, 6a and 6b, a light source 7, and a dual-electrode MZ modulator 8.

The dual-electrode MZ modulator 8 is constituted of two phase modulators, 8a and 8b.

In the following description, the look-up table 2 is referred to as LUT 2. The D/A converters (digital/analog converters) 5a and 5b are referred to as DACs 5a and 5b.

Respective functions of the components of the optical transmitter are described below.

The S/P conversion unit 1 develops in parallel an input data series that has been input to the optical transmitter, in keeping with the processing rate of the LUT 2. The LUT 2 has as many tables as the number of parallel streams developed by the S/P conversion unit 1, and outputs set values of the DACs 5a and 5b (first modulation data and second modulation data) that are associated with the input data series developed in parallel. The LUT 2 stores data for accomplishing optical multi-level modulation, and the stored data can be reset to new data. The LUT control unit 3 (look-up table control means) changes stored data of the LUT 2 as the need arises. The processing of changing stored data which is executed by the LUT control unit 3 is described later.

The P/S conversion unit 4 performs P/S conversion on an output from the LUT 2 to generate set values of the DACs 5a and 5b that have a data rate suited to the output data update rate of the DACs 5a and 5b, and outputs the set values to the DACs 5a and 5b, respectively. The DACs 5a and 5b perform D/A conversion on the set values output from the P/S conversion unit 4 to respectively generate a first multi-level signal and a second multi-level signal. The electrical amplifiers 6a and 6b amplify the first and second multi-level signals from the DACs 5a and 5b to a voltage amplitude necessary for optical modulation, thereby respectively generating a first drive electrical signal $V1(t)$ and a second drive electrical signal $V2(t)$.

The dual-electrode MZ modulator 8 drives the phase modulators 8a and 8b with the first and second drive electrical signals $V1(t)$ and $V2(t)$, which are from the electrical amplifiers 6a and 6b, to modulate continuous-wave (CW) light from the light source 7, and outputs a modulated optical signal.

Data for accomplishing optical multi-level modulation is stored as stored data of the LUT 2, and hence an optical multi-level signal is obtained as the modulated optical signal output from the dual-electrode MZ modulator 8.

In order to output set values of the DACs 5a and 5b that are suited to the signal multiplicity (the number of signals mapped onto one symbol) of the optical multi-level signal, the table configuration of the LUT 2 has an address size equal to or larger than the signal multiplicity of the optical multi-level signal, and a bit width equal to or larger than the quantifying bit number of the DACs 5a and 5b. This table configuration allows desired set values of the DACs 5a and 5b to be read by referring to data with a bit string of an input data series as the address.

Optical multi-level modulation is described below taking as an example a case in which modulation by 16-QAM is executed with the use of the dual-electrode MZ modulator 8 (DDMZM).

Figure 2:
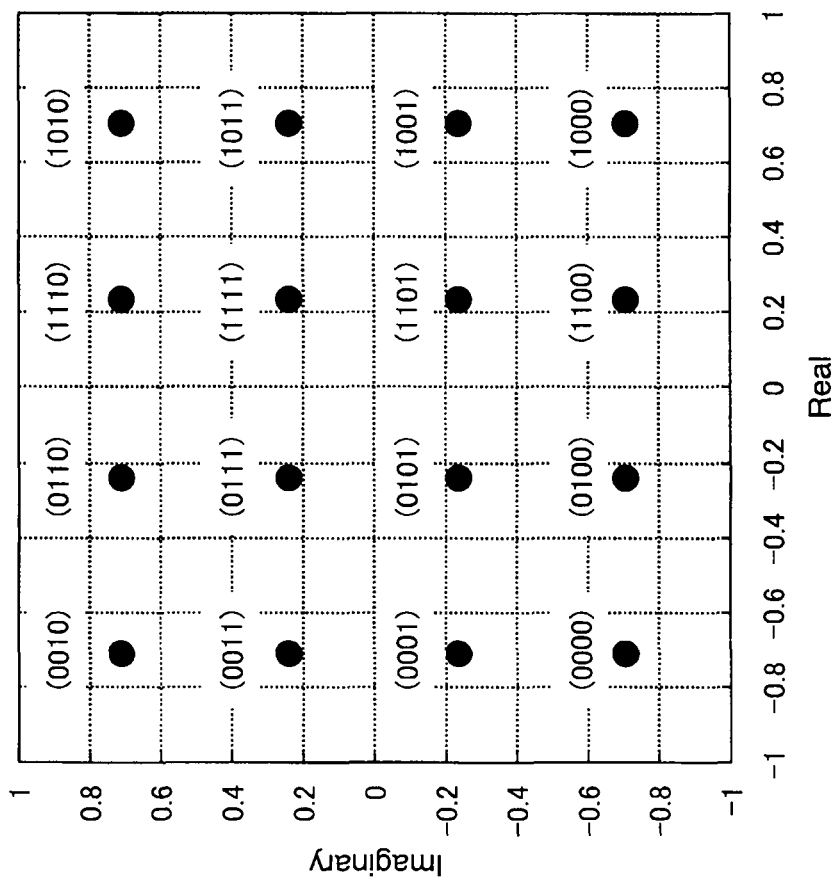
FIG. 2 An explanatory diagram illustrating an example of the relation between a 4-bit input data set and the arrangement of signal constellation points on a complex plane according to the first embodiment of the present invention.

In modulation by 16-QAM, one symbol of an optical signal is assigned 4-bit data. Through this operation of turning a signal into a multi-level signal, an optical signal that has a symbol rate of, for example, 10 Gsymbol/s can be used to transfer information of 40 Gb/s. An example of the relation between a 4-bit input data set and the arrangement of signal constellation points on a complex plane is illustrated in FIG. 2.

A transfer function of the dual-electrode MZ modulator 8 is expressed by the following Expression (1) based on the display format of polar coordinates. In Expression (1), $V_\pi$ represents the half-wave voltage of the dual-electrode MZ modulator 8.

[Expression 1]

$$|E(t)|\exp[j\phi(t)] = \cos\left[\frac{V_1(t) - V_2(t)}{2V_\pi}\pi\right]\exp\left[j\frac{V_1(t) + V_2(t)}{2V_\pi}\pi\right] \quad (1)$$

The first and second drive electrical signals $V1(t)$ and $V2(t)$ that are necessary to generate the signal constellation points of FIG. 2 are expressed by the following Expression (2) through inverse transform of Expression (1).

[Expression 2]

$$\begin{cases} V_1(t) = \dfrac{V_\pi}{\pi}[\phi(t) + \cos^{-1}(|E(t)|)] \\ V_2(t) = \dfrac{V_\pi}{\pi}[\phi(t) - \cos^{-1}(|E(t)|)] \end{cases} \quad (2)$$

The DACs 5a and 5b are used to actually output voltages necessary for the generation of the signal constellation points expressed by Expression (2). The output data update rate of the DACs 5a and 5b is commonly set to a rate twice the transmission symbol rate or higher.

Figure 3:
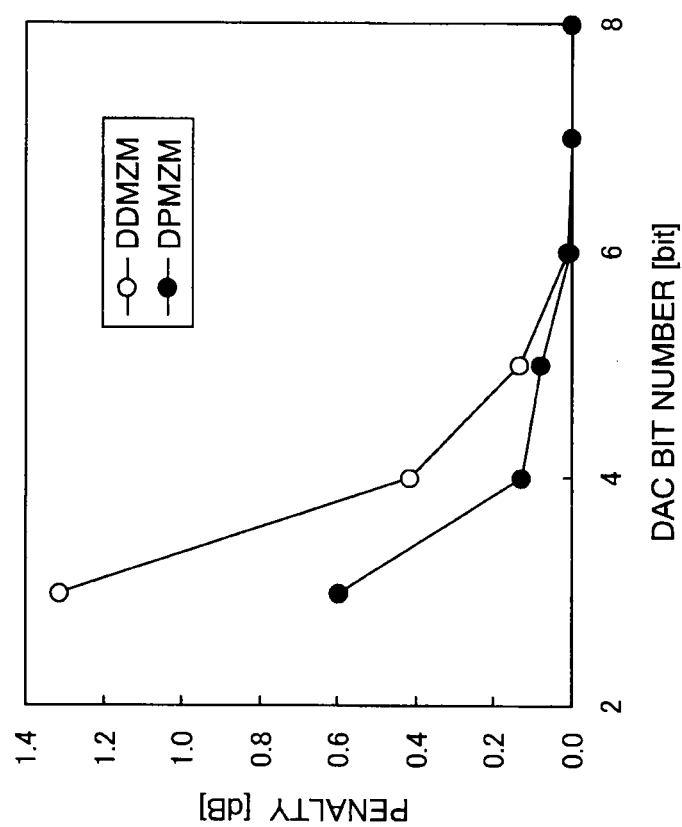
FIG. 3 An explanatory diagram illustrating the relation between the resolution (bit number) of DACs and a penalty according to the first embodiment of the present invention.

FIG. 3 illustrates the relation between the resolution (bit number) of the DACs 5a and 5b and a penalty, which is expressed by the average value of the amounts of deviation from an optimum signal constellation point.

In FIG. 3, white circles represent calculation results with respect to the dual-electrode MZ modulator 8 (DDMZM) and black circles represent calculation results with respect to the dual parallel MZ modulator (DPMZM) described above.

It is understood from FIG. 3 that the DACs 5a and 5b that have a resolution of 6 bits or higher are suitable for the use of the dual-electrode MZ modulator 8 (DDMZM), when taking into consideration a range where the penalty is negligible.

FIG. 4 illustrates an example of the first and second drive electrical signals $V1(t)$ and $V2(t)$ that are necessary to realize the signal constellation point arrangement of FIG. 2 and stored data of the LUT 2 that is stored when the DACs 5a to 5b have a resolution of 6 bits.

In FIG. 4, the values of the first and second drive electrical signals $V1(t)$ and $V2(t)$ are the values of voltages applied to the dual-electrode MZ modulator 8 that are expressed with the half-wave voltage of the dual-electrode MZ modulator 8 as a reference.

The LUT 2 uses a 4-bit data set as an address input and uses, as an output, 6-bit stored data that is associated with the address, thereby obtaining 6-bit data to be set to the DACs 5a and 5b.

The 4-bit data set is also associated with the signal constellation points of FIG. 2. Therefore, by driving the dual-electrode MZ modulator 8 with outputs from the DACs 5a and 5b which correspond to 6-bit data obtained as outputs of the LUT 2, signal constellation points suited to modulation by 16-QAM are realized as an optical multi-level signal.

When the output data update rate of the DACs 5a and 5b is set to a rate n times the symbol rate of the optical multi-level signal in this example, optimum data can be set for each scheduled update of output data of the DACs 5a and 5C by preparing n or more sets of stored data of the LUT 2 illustrated in FIG. 4.

The first and second drive electrical signals $V1(t)$ and $V2(t)$ and stored data of the LUT 2 are not limited to the values of FIG. 4, and can take other values as long as the same signal constellation point arrangement is realized with that combination of values. FIG. 5 illustrates another example of the first and second drive electrical signals $V1(t)$ and $V2(t)$ and stored data of the LUT 2 that is stored when the DACs 5a and 5b have a resolution of 6 bits.

Figure 6:
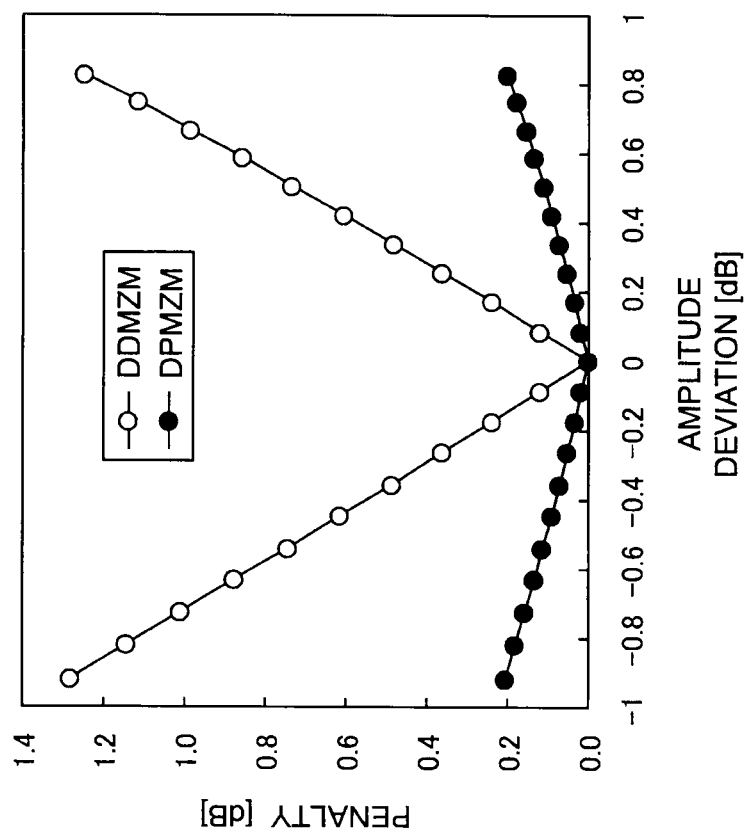
FIG. 6 An explanatory diagram illustrating the relation between a drive amplitude fluctuation (amplitude deviation) and a penalty when the first drive electrical signal and the second drive electrical signal that conform to the table settings of FIG. 4 are used.

FIG. 6 illustrates the relation between a drive amplitude fluctuation (amplitude deviation) and a penalty when the first and second drive electrical signals $V1(t)$ and $V2(t)$ that conform to the table settings of FIG. 4 are used.

In FIG. 6, white circles represent calculation results with respect to the dual-electrode MZ modulator 8 (DDMZM) and black circles represent calculation results with respect to the DPMZM.

It is understood from FIG. 6 that the tolerance for a deviation from optimum settings of the drive electrical signals is smaller when the dual-electrode MZ modulator 8 (DDMZM) is used than when the DPMZM is used.

Figure 7:
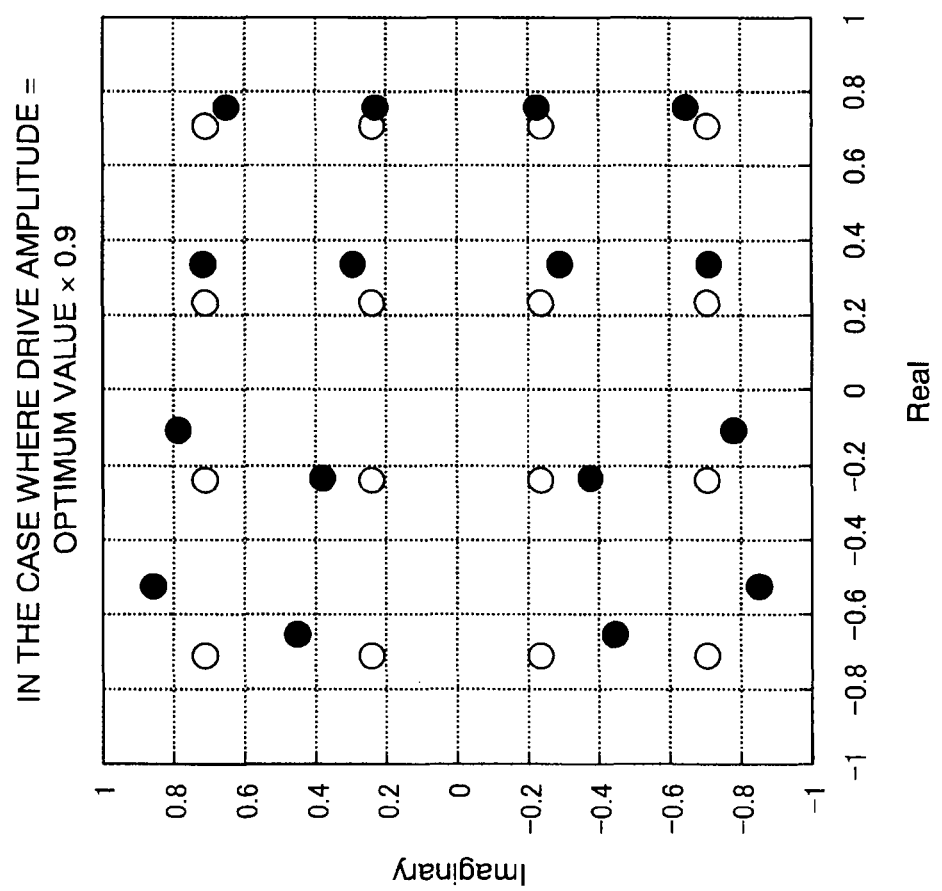
FIG. 7 An explanatory diagram illustrating the relation between a 4-bit input data set and the arrangement of signal constellation points on a complex plane when the drive amplitude of the drive electrical signals is reduced from an optimum value (to 0.9 times) in the first embodiment of the present invention.
Figure 8:
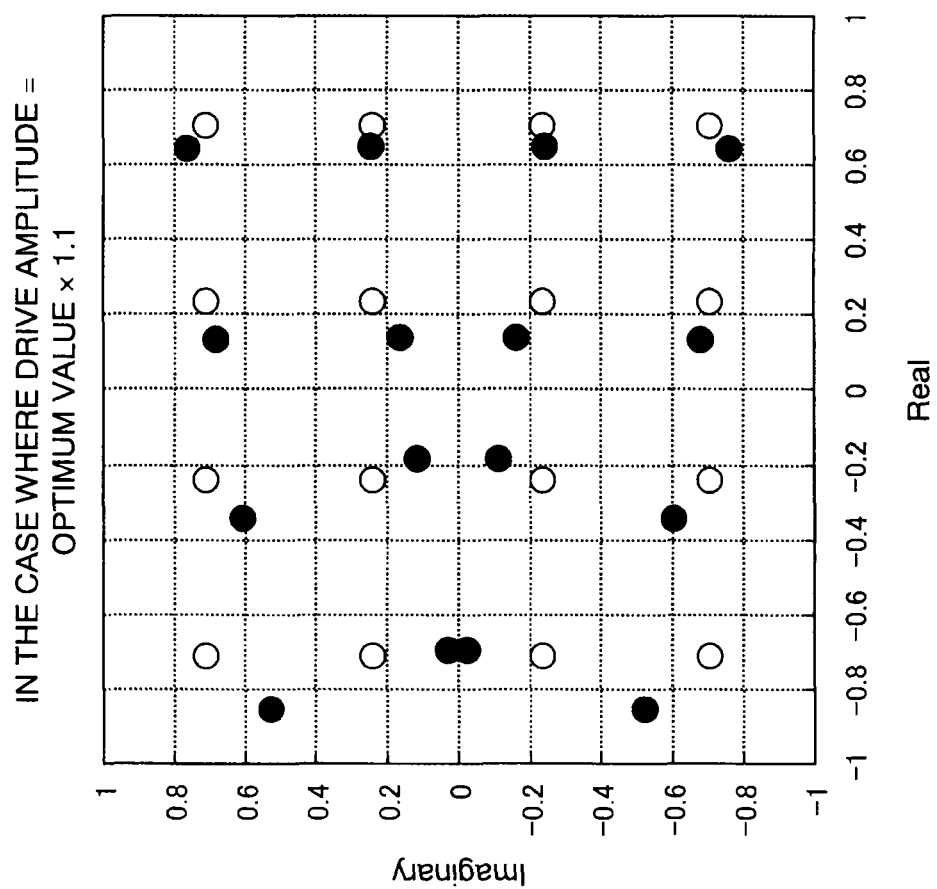
FIG. 8 An explanatory diagram illustrating the relation between a 4-bit input data set and the arrangement of signal constellation points on a complex plane when the drive amplitude of the drive electrical signals is increased from the optimum value (to 1.1 times) in the first embodiment of the present invention.

FIG. 7 illustrates the relation between a 4-bit input data set and the arrangement of signal constellation points on a complex plane when the drive amplitude of the drive electrical signals is reduced from an optimum value (to 0.9 times). FIG. 8 illustrates the relation between a 4-bit input data set and the arrangement of signal constellation points on a complex plane when the drive amplitude of the drive electrical signals is increased from the optimum value (to 1.1 times).

In FIGS. 7 and 8, white circles represent a signal constellation point arrangement that corresponds to the optimum drive amplitude, and black circles represent a signal constellation point arrangement that is observed when the drive amplitude deviates from the optimum value.

It is understood from FIGS. 7 and 8 that a deviation of the drive amplitude greatly affects the signal quality.

When the optical transmitter is actually driven, an optimum drive amplitude of drive electrical signals to be applied to the dual-electrode MZ modulator 8 does not match stored data of the LUT 2 in some cases even when the stored data of the LUT 2 illustrated in FIG. 4 is optimum settings. Possible factors for this include the incompleteness of outputs of the DACs 5a and 5b, individual differences in gain and in the amplitude of output signals between the electrical amplifiers 6a and 6b, and individual differences in the half-wave voltage of the dual-electrode MZ modulator 8.

The deterioration of signal quality can therefore be reduced by measuring in advance a deviation of the drive voltage due to the characteristics of the DACs 5a and 5b, the characteristics of the electrical amplifiers 6a and 6b, the necessary drive voltages of the phase modulators 8a and 8b, which constitute the dual-electrode MZ modulator 8, and other factors, and correcting stored data of the LUT 2 in a manner that reduces the measured deviation of the drive voltage.

Another method of reducing the deterioration of signal quality is to keep the amplitude of the drive electrical signals optimum by changing stored data of the LUT 2 as the need arises with the use of the LUT control unit 3. In this case, a deviation of the drive voltage due to the characteristics of the DACs 5a and 5b, the characteristics of the electrical amplifiers 6a and 6b, the necessary drive voltages of the phase modulators 8a and 8b, which constitute the dual-electrode MZ modulator 8, and other factors is detected as needed and stored data of the LUT 2 is changed in accordance with the amount of deviation.

In this manner, stored data of the LUT 2 can be set for each individual optical transmitter to suit the performance of the components after the optical transmitter is built, and the deterioration of signal quality is prevented.

Methods that can be used to optimize stored data of the LUT 2 include one in which an optical multi-level signal output from the dual-electrode MZ modulator 8 is observed and an adjustment is made to obtain optimum signal constellation points, one in which multiplication by reverse characteristics of a series obtained from a response to a known training pattern is performed, and one in which the error rate of received data in an opposed optical receiver is minimized.

The observation result of an optical multi-level signal that is usually used is a signal series expressed by a Cartesian coordinate system of an I-channel component (real component) and a Q-channel component (imaginary component) as the arrangement of signal constellation points on a complex plane. When the dual-electrode MZ modulator 8 is used, because the drive electrical signals and the optical multi-level signal have the relation expressed by the above Expression (1), a deviation from an ideal state of the I-channel component and the Q-channel component of the optical multi-level signal does not correspond to the drive electrical signals on a one-on-one basis, unlike when the DPMZM is used.

Therefore, in the case where the reverse characteristics described above are extracted in a system that uses the dual-electrode MZ modulator 8, arithmetic operation performed needs to take into account the transfer functions of the dual-electrode MZ modulator 8 which are expressed by the above Expressions (1) and (2).

FIG. 9 is an explanatory diagram illustrating an example of how stored data of the LUT 2 is set when the drive amplitude of the drive electrical signals is reduced from an optimum value.

The premise of FIG. 9 is that the DACs 5a and 5b have a resolution of 7 bits and that the LUT 2 in an initial state stores data of FIG. 4 which is equivalent to a resolution of 6 bits.

When the voltage amplitude in the initial state is 0.9 times the optimum value and a compensation for turning the voltage amplitude to 1.1 times the optimum value (=an increase by 1/0.9 times) is to be executed, the drive electrical signals are easily compensated by changing the stored data of the LUT 2 to values in the two right-hand side columns of FIG. 9. Modulation by 16-QAM can thus be executed under optimum drive conditions.

As illustrated in FIG. 9, the bit width of stored data of the LUT 2 and the bit width of the DACs 5a and 5b desirably have a size obtained by adding a compensation bit to a bit number necessary for a modulation method to be implemented. For instance, when a bit width necessary to execute modulation by 16-QAM is estimated as 6 bits based on the penalty of FIG. 3, the stored data of the LUT 2 is set to 7 bits, and by using the DACs 5a and 5b that have a resolution of 7 bits, the compensation processing of FIG. 9 can be executed.

The description given next is about a memory capacity that the LUT 2 has when, for example, information of 40 Gb/s is transferred through modulation by 16-QAM.

Here, the symbol rate of an optical multi-level signal to be generated is 10 Gsymbol/s, the resolution of the DACs 5a and 5b is 7 bits, the data width of stored data of the LUT 2 is 7 bits, the rate of scheduled update of outputs of the DACs 5a and 5b is twice the symbol rate of the optical multi-level signal (double oversampling), and an internal operation of the S/P conversion unit 1 is 64-bit parallel computing.

The LUT 2 in this case needs to have only a memory capacity of 14 Kbits (=64×16×7×2) for stored data of the first drive electrical signal V1($t$) and stored data of the second drive electrical signal V2($t$) each.

The optical transmitter according to the first embodiment of the present invention includes a look-up table in which data for executing optical multi-level modulation is stored and from which first modulation data and second modulation data are output based on an input data series. This way, the first modulation data and the second modulation data are each output on a one-on-one basis with respect to an input data series.

The processing load of multi-level modulation processing can thus be lessened.

This optical modulator also includes look-up table control means which changes stored data of the look-up table as the need arises.

Stored data of the look-up table can therefore be set for each individual optical transmitter to suit the performance of the components after the optical transmitter is built, and the deterioration of signal quality is prevented.

The first embodiment takes as an example a compensation of the drive amplitude of the dual-electrode MZ modulator 8 in FIG. 8. However, the present invention where data setting using the LUT 2 is executed can handle linear compensation and non-linear compensation both.

The first embodiment describes a case in which the additional bit is 1 bit in FIG. 8. However, the present invention is not limited thereto and a bit width suited to what compensation is to be made may be added arbitrarily.

The first embodiment describes data compensation executed at the time when signal constellation points are realized. However, common linear compensation and common non-linear compensation which use n-times oversampling data can be executed by having n table values associated with scheduled updates of outputs of the DACs 5a and 5b for the same signal constellation point.

The first embodiment takes into account only the characteristics of the components of the optical transmitter in a compensation of stored data of the LUT 2, but the present invention is not limited thereto. When stored data of the LUT 2 is compensated by additionally taking into account the characteristics such as (signal error rate) of an optical receiver which is opposed to the optical transmitter, there is more chance of accomplishing optimum operation. The characteristics of the optical receiver can be fed back through a communication path of the opposite direction, through information transfer with the use of monitoring control light or a public network, or the like.

The use of the LUT 2 allows signal arrangement (mapping) of an input data series to a multi-level signal and a compensation of the drive electrical signals to be executed simultaneously. The circuit size can therefore be reduced.

REFERENCE SIGNS LIST

2 look-up table (LUT), 3 LUT control unit (look-up table control means), 5a, 5b DAC (first D/A converter and second D/A converter), 7 light source, 8 dual-electrode MZ modulator, 8a, 8b phase modulator

The invention claimed is:

1. An optical transmitter for converting an input data series which is an input electrical signal into an optical multi-level signal and for outputting the optical multi-level signal, comprising:
   a look-up table in which data for executing optical multi-level modulation is stored and from which first modulation data and second modulation data are output based on the input data series;

a first D/A converter which converts the first modulation data by D/A conversion to generate a first multi-level signal;

a second D/A converter which converts the second modulation data by D/A conversion to generate a second multi-level signal;

a look-up table circuit configured to compensate stored data which is stored in the look-up table based on characteristics of the first D/A converter and the second D/A converter; and a dual-electrode MZ modulator which comprises a first phase modulator for modulating light from a light source in accordance with the first multi-level signal and a second phase modulator for modulating light from the light source in accordance with the second multi-level signal, and which combines an optical signal from the first phase modulator and an optical signal from the second phase modulator to output the optical multi-level signal, wherein the look-up table has an address size equal to or larger than a signal multiplicity of the optical multi-level signal and a bit width equal to or larger than a quantifying bit number of the first and second D/A converters.

2. An optical transmitter according to claim 1, wherein the look-up table circuit is configured to compensate stored data which is stored in the look-up table in a manner that gives the output optical multi-level signal a desired value.

3. An optical transmitter according to claim 2, wherein the look-up table circuit is configured to compensate the stored data in a manner that minimizes a deviation of the optical multi-level signal from an optimum value of a signal constellation point arrangement.

4. An optical transmitter according to claim 2, wherein the look-up table circuit is configured to compensate the stored data by multiplying the stored data by reverse characteristics of response characteristics of the input data series with respect to a known training pattern.

5. An optical transmitter according to claim 2, wherein the look-up table circuit is configured to compensate the stored data in a manner that minimizes a signal error rate in an optical receiver opposed to the optical transmitter.

6. An optical transmitter according to claim 1, wherein, when a ratio of an output data update rate of the first D/A converter and the second D/A converter and a symbol rate of the optical multi-level signal is n, the look-up table has n or more sets of stored data, and switches the stored data at the time when a scheduled update of output data of the first D/A converter and the second D/A converter is executed.

7. An optical transmitter according to claim 1, wherein the look-up table has stored data compensated in a manner that minimizes a deviation of the optical multi-level signal from an optimum value of a signal constellation point arrangement based on necessary drive voltages of the first phase modulator and the second phase modulator which are measured in advance.

* * * * *